United States Patent

[11] 3,557,366

| [72] | Inventor | Ernest D. Jernigan, Jr. |
| | | Columbus, Ohio |
| [21] | Appl. No. | 631,328 |
| [22] | Filed | Apr. 17, 1967 |
| [45] | Patented | Jan. 19, 1971 |
| [73] | Assignee | Industrial Nucleonics Corporation |
| | | a corporation of Ohio |

[54] ANGLE OF ATTACK INDICATOR USING A RADIOACTIVE SOURCE AND DETECTOR
13 Claims, 1 Drawing Fig.

[52] U.S. Cl. .................................................. 250/43.5,
250/83.3; 244/3.15
[51] Int. Cl. ........................................................... G01n 23/12
[50] Field of Search ........................................... 250/43.5D,
106VC, 83.3; 244/3.15, 3.21; 102/70.2

[56] References Cited
UNITED STATES PATENTS

| 3,196,271 | 7/1965 | Wright ........................... | 250/43.5D |
| 3,234,389 | 2/1966 | Boehm et al. ................. | 250/43.5D |
| 3,327,631 | 6/1967 | Howard et al. ................ | 250/43.5D |

Primary Examiner—Archie R. Borchelt
Attorney—Cushman, Darby & Cushman, C. Henry Paterson, William T. Fryer III and James J. O'Reilly ABSTRACT: In order to provide an instantaneous indication of the angle of attack of a body traveling through the air at supersonic speeds, opposite surfaces of the leading edge of the body are provided with nucleonic radiation sources so directed as to intercept the shockwave created by the body with nucleonic radiation, some of which is reflected to radiation detectors also mounted on the body opposite surfaces. The outputs of the detectors are fed to a ratio computer and from there to a visual display device.

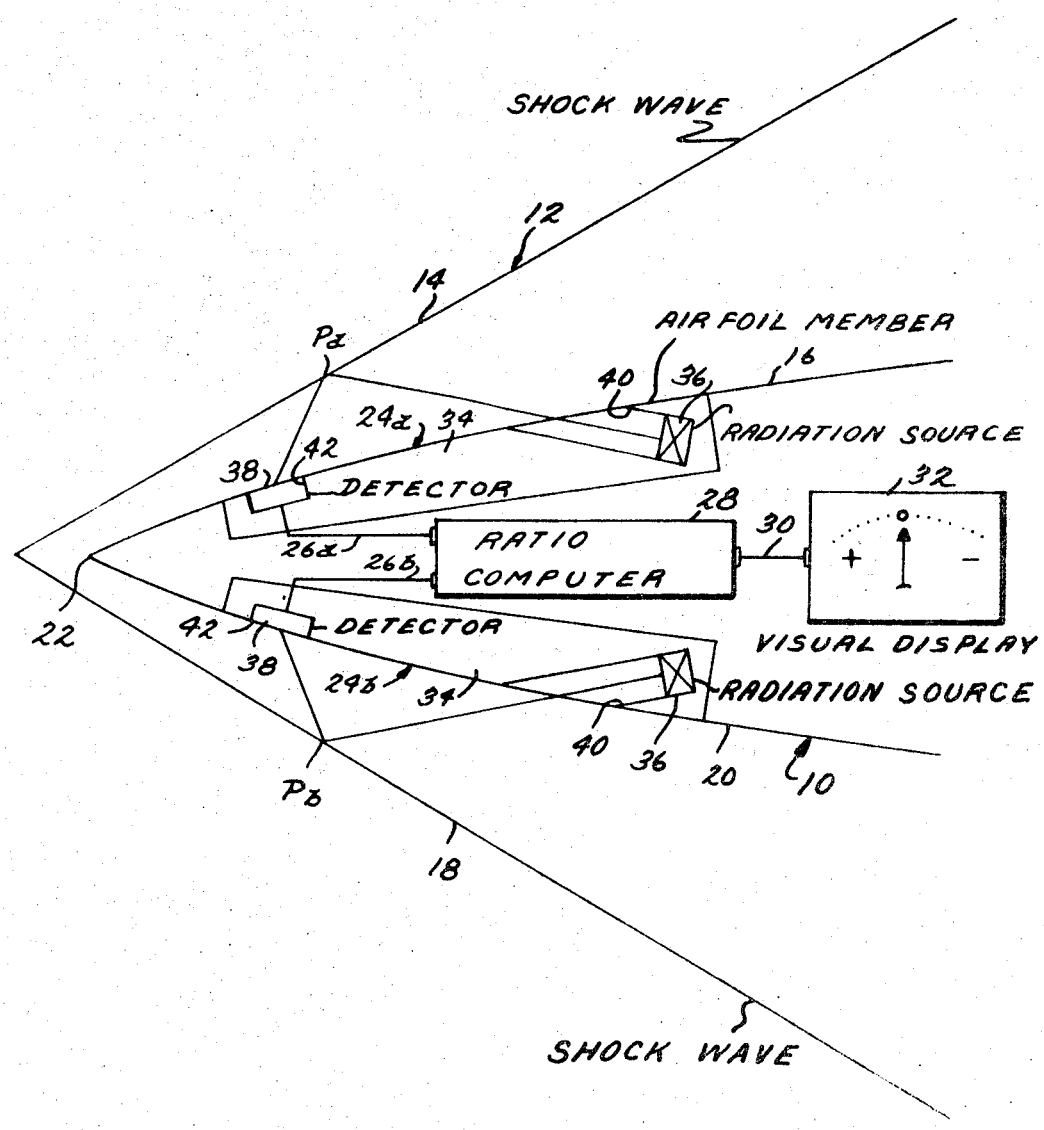

ANGLE OF ATTACK INDICATOR USING A RADIOACTIVE SOURCE AND DETECTOR

BACKGROUND OF THE INVENTION

It is well known that as a body, such as a foil member, of an aircraft, space craft or the like travels through air at supersonic speed, a forwardly pointed, rearwardly divergent shockwave is normally setup about the body at the interface of subsonic and supersonic velocity air. For a given point on the upper and lower surface of the body, when the craft is in level flight, the distance between the respective point and the shockwave is a quantity which can be ascertained. When the craft veers, arches or dives, the shockwave moves with respect to the body upper and lower surfaces so as to become closer to one than it was during level flight.

SUMMARY OF THE INVENTION

It is an object of the present invention to provide a system for measuring the distance from diverse points on a body traveling through air at supersonic speed to the shockwave thereabout and providing an instantaneous, continuous visual result of comparing these distances so the operators of the craft may achieve a desired angle of attack. In the preferred embodiment, nucleonic radiations are beamed from the upper and lower sides of a foil member on the craft near the leading edge of the foil member and reflected from the shockwave to detectors mounted on the craft, the relative amounts of reflected radiation being directly proportional to a function of the relative proximity, so that a ratio of reflected radiation from the two sides of the shockwave provides a useful indication of angle of attack.

BRIEF DESCRIPTION OF THE DRAWING

In the drawing, the FIG. is a schematic view of a craft provided with an angle of attack indicator in accordance with the principles of the present invention.

DESCRIPTION OF THE PREFERRED EMBODIMENT

The numeral 10 indicates the leading edge region of a portion of a flying craft proceeding leftwards, through the air at supersonic velocity so as to set up a shockwave 12 about the craft portion. The shockwave 12 has a segment 14 which passes over the upper surface 16 of the craft portion 10 and a segment 18 which passes under the lower surface 20 of the craft portion 10. It should be apparent that the craft portion 10 may be a foil member such as a wing, or a rotor blade or the like. It should also be apparent that the terms "upper" and "lower" are used herein in their usual sense, i.e. relating to a craft in right-side-up level flight, although the invention is by no means limited to use on a craft so oriented. Within the craft portion 10, near the leading edge 22, in the top of the portion 10 is provided at least one sensor 24a constructed and arranged to sense the distance between a point on the top of the craft portion 10 and a point on the shockwave segment 14. Similarly, the bottom of the craft portion 10 is provided near the leading edge 22 thereof with a sensor 24b constructed and arranged to provide an indication of the distance between a point on the craft bottom and the shockwave segment 18. Although only one sensor 24a and one sensor 24b is shown, in practice, several similar or identical sensors 24a, 24b may be employed.

Each sensor 24a, 24b conveys its information through a cable 26a, 26b to a ratio computer 28 of conventional design constructed and arranged to provide an output that is proportional to the ratio of the two input signals through 26a, 26b. The ratio computer output may be supplied via a cable 30 to an indicator panel 32.

Obviously, if the craft is one of the type to be controlled throughout flight by an onboard operator, the ratio computer 28 and visual display 32 are best located on the craft itself, whereas in instances where the craft is of the type to be at least optionally remotely controlled it is within the purview of this invention to locate the ratio computer 28 and/or the visual display 32 at the remotely controlled location and to provide means on the craft for transmitting output signals from the sensors 24a, 24b or ratio computer 28 to the remote control location.

Each sensor 24a, 24b, in the embodiment illustrated, includes a housing 34 within which is mounted a back scatter or reflection type nucleonic radiation device including a radiation source 36 and a detector 38. Each source 36 may provide any desired type of nucleonic radiation including electromagnetic radiation, for example, gamma rays from a pure gamma emitter, beta-excited bremsstrahlung X-rays or a controlled mixture of beta and bremsstrahlung X-rays as fully disclosed in the commonly assigned, copending U.S. Pat. application of Chope, Ser. No. 408,955, filed Nov. 4, 1964, now Pat. No. 3,439,166. As illustrated, the radiation from the respective sources 36 is directly outwardly and forwardly toward the segments 14, 18 of the shockwave at an acute angle and the respective detectors 38 are oriented at similar angles to receive radiation reflected or backscattered by the shockwave. The output signals from the detectors 38 which are conveyed from the ratio computer 28 and from there to the visual display meter 32, vary directly with the distance between the points P where the respective streams of radiation intercept the shockwave segments 14 and 18, and the respective detectors 38.

The housing 34 comprise radiation shields each having two collimated openings or windows 40 or 42 through which the radiation passes from and returns to the sensors 24a, 24b. The shields 34 prevent radiation from interfering with any other instrumentation on the craft.

As an example, if the sources 36 comprise a radioisotope that emits gamma photons, the photons travel in a straight line until they encounter the shockwave segments 14, 18, whereupon photons will be scattered in all directions. Some of these photons will be scattered or reflected back toward the respective detectors 38. Each detector 38 will then provide an electrical signal that is proportional to the number of photons received per unit time. Due to the placement of the shield 34, the only photons that reach the detector 38 of the sensor 24a are those which have been backscattered by the shockwave segment 14 at the point $P_a$ and the only photons that reach the detector 38 of the sensor 24b are those which have been backscattered from the segment 18 of the shockwave at point $P_b$. Because the backscattered photons are diverging as they travel, the closer the point $P_a$, $P_b$ is to its respective detector 38, the greater the number of photons which will reach the respective detector per unit time.

Each detector 38 may be any one of several types of conventional detectors: for example, a scintillator, an ion chamber, or a solid-state radiation detector.

The output of each detector 38 is an analogue signal that may be readily amplified if necessary, by conventional amplifying devices to furnish an acceptable signal for the ratio computer 28.

In the figure, the craft is shown proceeding toward the left in level flight, the points $P_a$ and $P_b$ being equidistance from the respective detectors 38. Thus the ratio computer computes a ratio of one which is supplied to the visual display device 32 via the cable 30 to provide a null indication. Upon diving or climbing, the resultant movement of the shockwave with respect to the craft portion 10 will be picked up by the respective detectors 38 as an increase in back scattered radiation detected by one and a decrease in backscattered radiation detected by the other. This information supplied to the ratio computer via the cables 26a, 26b will result in a proportionate deflection of the indicator of the visual display device in a positive or negative sense from the null position thereof, according to a preselected convention. Although the display device 32 as shown is of the type having a needle constructed and arranged to sweep over a calibrated dial, it would be within the purview of the invention to supply the output of the ratio computer 28 to visual displays of other conventional type as will occur to those of ordinary skill in the art upon reading this disclosure.

Although in the preferred embodiment shown in the drawing, the two sensors 24a, 24b are on opposite surfaces of the foil member, the detector of each being forward of the radiation source thereof and the device which converts the data provided by the sensors into input for a meaningful visual display is a ratio computer, there are viable alternatives to each of these features, within the purview of the invention. The two sensors will also operate to provide the desired data, when mounted one behind the other on a single surface, for instance the upper surface, of the foil member. Then if the distance between one sensor and its sensing point at the shockwave is, for instance X, when the craft is in level flight, and the distance between the other sensor and its sensing point at the shockwave is, for instance 3X, a change of angle of attack produces a movement of the shockwave relative to both sensors so that the two distances are for instance X-a and 3X-b.

It should now be apparent that such changes, once accurately and rapidly sensed in accordance with the present invention, are susceptible of being compared with one another and/or with previously obtained standards in order to provide a visual display susceptible of rapid, meaningful interpretation. Instead of a ratio computer, the manipulation of the sensor-provided data can be successfully accomplished using a conventional comparator provided with an analogue or template of the location of the shockwave at the respective sensing points as a function of most significant parameters, including air density and velocity of the foil with respect to the air. These analogues or templates vary in shape, depending principally upon the shape of the foil member and resistance it presents to the flow of air over its exterior surface and are empirically constructed using established aerodynamic principles and techniques during wind tunnel tests on models of the foil members and during flight tests of prototype craft. In instances where sensor-provided data is compared with previously obtained values to provide an indication of angle of attack, by measurement of variation from the previously obtained values, the number of sensors supplying input to the comparator(s) may vary upwards from one.

The sensors 24a, 24b, will also perform satisfactorily when the respective radiation sources are mounted where the respective detectors are shown and vice versa or closer or further from one another so long as the respective radiation sources are so directed as to emit radiation which will encounter the shockwave and the respective detectors are so directed as to be in the path of radiation emanating from the respective radiation source that is reflected or backscattered from the shockwave. Beside operations directly upon the data provided by the sensors 24a, 24b, conventional integrators may be interposed in the circuits 26a, 26b for instance to integrate the sensor-to-shockwave distance measurements against time or velocity of the foil with respect to the air. The resultant signal may then be fed to a ratio computer 28, comparator or other device for constructing angle of attack intelligence from the sensed information, and from there to a visual display 32. Of course, as needed, other conventional components such as amplifiers, filters, gates and radiation shielding may be incorporated in the circuits 26a, 26b.

For some purposes, a comparison or ratio computation of the output signals provided by the detectors 38 may not be necessary, the output signals being then provided directly to the visual display device 32 which in that instance may exhibit visual indications of the magnitude of each signal separately in a side-by-side relationship, for instance on two bar graph displays.

It should now be apparent that the angle of attack indicator as described hereinabove, possesses each of the attributes set forth in the specification under the heading "Summary of the Invention" hereinbefore. Because the angle of attack indicator of the invention can be modified to some extent without departing from the principles of the invention as they have been outlined and explained in this specification as will become apparent to those of ordinary skill in the art upon reading this disclosure, the present invention should be understood as encompassing all such modifications as are within the spirit and scope of the following claims.

I claim:

1. An angle of attack indicator for a craft of the type that is constructed and arranged to pass through the air at supersonic velocity, setting-up a shockwave thereabout comprising: first nucleonic radiation sensor and source means mountable on the craft at a first location thereon and constructed and arranged to provide an output signal proportional to the proximity of a first point on the shockwave to the sensor means; second nucleonic radiation sensor and source means mountable on the craft at a second location thereon and constructed and arranged to provide an output signal proportional to the proximity of a second point on the shockwave to the second sensor means; and means for transmitting the output signals of the first and second sensor means to a ratio computer for providing an indication of the angle of attack of said craft.

2. The indicator of claim 1 further comprising a ratio computer located on board said craft; and wherein said transmitting means comprises a cable connecting said ratio computer to said first and second sensor means.

3. The indicator of claim 2 further comprising a visual display device on board said craft, said visual display device being operatively connected to said ratio computer and being constructed and arranged to receive the output thereof and provide a changeable visual display proportional thereto.

4. The indicator of claim 1 wherein each sensor and source means includes a radiation source constructed and arranged to emit nucleonic radiations toward a preselected region on the shockwave, and a detector constructed and arranged to receive radiations emitted from the respective radiation source then back scattered or reflected from said shockwave.

5. The indicator of claim 4 wherein each sensor and source means further includes a housing of radiation shielding material and having means defining a first collimating recess therein in which the respective radiation source is received and a second collimating recess therein in which the respective detector is received.

6. The indicator of claim 5 wherein the first and second recesses of each sensor and source means are angled with respect to one another so as to have a longitudinal axis intersection spaced outwardly from the craft.

7. The indicator of claim 4 wherein the first sensor and source means is mounted in the upper side of a foil member of the craft near the leading edge of the foil member and adapted to sense proximity to a segment of the shockwave that passes over the foil; and wherein the second sensor and source means is mounted in the lower side of the foil member of the craft near the leading edge of the foil member and adapted to sense proximity to a segment of the shockwave that passes under the foil.

8. An angle of attack indicator for a craft of the type that is constructed and arranged to pass through the air at supersonic velocity, setting up a shockwave thereabout, comprising: at least one sensor mounted on the craft proximate the shockwave, including a nucleonic radiation source emitting radiation encountering the shockwave, and a detector so directed toward the shockwave as to receive nucleonic radiation emitted by the nucleonic radiation source then reflected or backscattered by the shockwave, said detector including output means providing a signal proportional to said nucleonic radiation received by said detector.

9. The angle of attack indicator of claim 8, further including a visual display device calibrated in angle of attack units; and comparison means connected to said detector output means and providing input to said visual display device, said comparison means being constructed and arranged to convert said detector output means signal to an input signal for providing angle of attack visual indications on said visual display device.

10. A method for indicating the angle of attack of a craft of the type that is constructed and arranged to pass through the air at supersonic velocity, setting up a shockwave about the craft, comprising: emitting nucleonic radiation from the craft toward a selected region on the shockwave, detecting from the craft nucleonic radiation reflected or backscattered from the selected region and providing a signal proportional to the detected nucleonic radiation.

11. The method of claim 10 further including contemporaneously: emitting nucleonic radiation from the craft toward a second selected region on the shockwave, detecting from the craft nucleonic radiation reflected or backscattered from the second selected region and providing a signal proportional to the detected nucleonic radiation.

12. The method of claim 11 further including comparing the two signals with one another to provide a ratio thereof proportional to the angle of attack of the craft.

13. The method of claim 11 further including: providing an analogue of the position of the shockwave with respect to the craft at various angles of attack and comparing at least one of the signals to the analogue to provide an indication proportional to the angle of attack of the craft.